United States Patent
Qiu et al.

(10) Patent No.: US 10,977,205 B1
(45) Date of Patent: Apr. 13, 2021

(54) HDD DETECTION SYSTEM

(71) Applicant: HONGFUJIN PRECISION ELECTRONICS(TIANJIN)CO.,LTD., Tianjin (CN)

(72) Inventors: Duo Qiu, Shenzhen (CN); Yu-Jie Ma, Shenzhen (CN)

(73) Assignee: HONGFUJIN PRECISION ELECTRONICS(TIANJIN)CO., LTD., Tianjin (CN)

( * ) Notice: Subject to any disclaimer, the term of this patent is extended or adjusted under 35 U.S.C. 154(b) by 0 days.

(21) Appl. No.: 16/672,832

(22) Filed: Nov. 4, 2019

(30) Foreign Application Priority Data

Sep. 27, 2019 (CN) .......................... 201910921486.5

(51) Int. Cl.
*G06F 13/20* (2006.01)
*G06F 13/42* (2006.01)

(52) U.S. Cl.
CPC .......... *G06F 13/4282* (2013.01); *G06F 13/20* (2013.01); *G06F 2213/0028* (2013.01); *G06F 2213/0032* (2013.01)

(58) Field of Classification Search
CPC ................. G06F 13/4282; G06F 13/20; G06F 2213/0028; G06F 2213/0032
See application file for complete search history.

(56) References Cited

U.S. PATENT DOCUMENTS

| | | | |
|---|---|---|---|
| 2014/0313873 A1 | 10/2014 | Wu et al. | |
| 2015/0026526 A1* | 1/2015 | Mondal | G06F 11/221 714/43 |
| 2019/0272245 A1* | 9/2019 | Olarig | G06F 13/1668 |
| 2020/0057482 A1* | 2/2020 | Han | G06F 1/3221 |

FOREIGN PATENT DOCUMENTS

TW 201506614 A 2/2015

* cited by examiner

*Primary Examiner* — Tim T Vo
*Assistant Examiner* — Harry Z Wang
(74) *Attorney, Agent, or Firm* — ScienBiziP, P.C.

(57) ABSTRACT

A system for detecting HDDs and in-position states of each of them includes an HDD controller, an analysis module, and a BMC chip. The HDD controller is electrically connected to the HDDs for obtaining SGPIO information and outputting testing signals comprising the SGPIO information. The analysis module receives the testing signals and generates in-position state information according to voltage levels of the testing signals. The BMC chip is electrically connected to the analysis module. The BMC chip receives the in-position state information from the analysis module and generates a detection log accordingly.

15 Claims, 1 Drawing Sheet

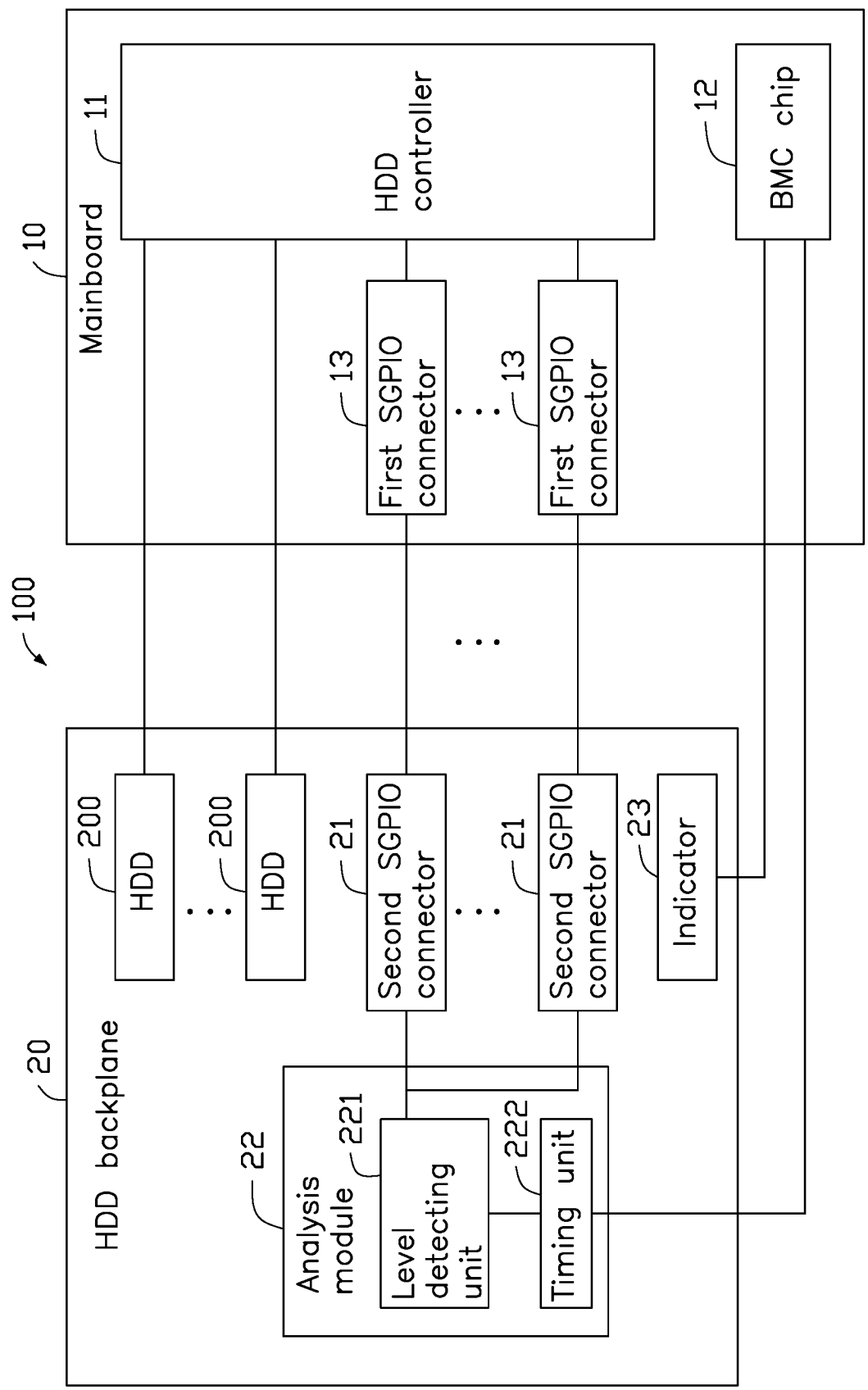

HDD DETECTION SYSTEM

FIELD

The subject matter herein generally relates to hard disk drive (HDD) detection.

BACKGROUND

In servers and memories, detecting or monitoring hard disk drives (HDDs) becomes more and more important.

However, existing HDDs only include a pin for distinguishing a type of the HDD, and does not include a pin for detecting an in-position state of the HDD.

Therefore, there is room for improvement within the art.

BRIEF DESCRIPTION OF THE DRAWING

Many aspects of the disclosure can be better understood with reference to the FIGURE. The components in the FIGURE are not necessarily drawn to scale, the emphasis instead being placed upon clearly illustrating the principles of the disclosure.

FIG. 1 is a block diagram of an HDD detection system according to an embodiment of the present disclosure.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates an HDD detection system 100 for detecting an in-position state of the HDD. The system 100 includes a mainboard 10 and an HDD backplane 20.

A plurality of HDDs 200 is inserted in the HDD backplane 20. In this embodiment, the HDDs 200 includes Serial Advanced Technology Attachment (SATA) HDDs and Serial Advanced Small Computer System Interface (SAS) HDDs. The system 100 is configured to acquire real-time in-position information of the HDDs 200, thereby determining whether the HDDs 200 are installed correctly and generating a detection report.

The mainboard 10 includes an HDD controller 11, a baseboard management controller (BMC) chip 12, and at least one first Serial General-Purpose Input/Output (SGPIO) connector 13.

The HDD controller 11 is electrically connected to the HDDs 200. The HDD controller 11 is configured to read SGPIO information of the HDDs 200. The SGPIO information includes serial number information and working state information of the HDD 200. The working state information includes a clock (SClock) signal, a data output (SDataout) signal, or a load (SLoad) signal.

The BMC chip 12 is configured to obtain real-time in-position information of the HDDs 200, thereby determining whether the HDDs 200 are installed correctly, and generating a detection report.

In this embodiment, the HDDs 200 are divided into several groups. Each group of HDDs 200 corresponds to one first SGPIO connector 13. The first SGPIO connectors 13 can be electrically connected to the HDD controller 11 through an SGPIO data line. The first SGPIO connectors 13 receive a testing signal sent by the HDD controller 11 and transmit the testing signal to the HDD backplane 20. The HDD backplane 20 detects the in-position state of the HDDs 200 according to the testing signal. In one embodiment, the testing signal may be the clock (SClock) signal, the data output (SDataout) signal, or the load (SLoad) signal.

The HDD backplane 20 is electrically connected to the mainboard 10. The HDD backplane 20 includes at least one second SGPIO connector 21 and an analysis module 22.

In one embodiment, the number of the second SGPIO connectors 21 corresponds to the number of the first SGPIO connectors 13. Each of the second SGPIO connectors 21 may be electrically connected to one first SGPIO connector 13 through a SGPIO data line. As such, the second SGPIO connectors 21 can be electrically connected to the HDD controller 11 through the first SGPIO connectors 13, thereby receiving the testing signal.

In this embodiment, one group of the first SGPIO connectors 13 and the second SGPIO connectors 21 correspond to one or one group of HDDs 200. That is, the HDD backplane 20 can obtain the testing signals of one or more HDDs 200 through one first SGPIO connector 13 and one second SGPIO connector 21 connected to each other.

The analysis module 22 is electrically connected to the second SGPIO connectors 21 through SGPIO data lines. The analysis module 22 receives the testing signals from the HDD controller 11. In this embodiment, the analysis module 22 includes a level detecting unit 221 and a timing unit 222. The level detecting unit 221 is electrically connected to the second SGPIO connectors 21 and the timing unit 222. The level detecting unit 221 is configured to receive and detect the testing signal in real time.

For example, when the level detecting unit 221 detects that a voltage level of the testing signal is maintained at a first level (for example, logic 0) within a predetermined time, the level detecting unit 221 determines that an HDD 200 is not present.

When the level detecting unit 221 detects a rising edge of the testing signal, the timing unit 222 is enabled to calculate a time of the testing signal being maintained at a second voltage level (for example, logic 1). When the level detecting unit 221 detects that the period of the testing signal being maintained at the second voltage level (for example, logic 1) is greater than or equal to the predetermined time, the level detecting unit 221 determines that the HDD 200 is present and the HDD controller 11 is uninitialized.

When the level detecting unit 221 detects that the period of the testing signal being maintained at the second voltage level (for example, logic 1) is less than the predetermined time and that voltage level of the testing signal alternates between high and low within the predetermined time, the level detecting unit 221 determines that the HDD 200 is present and the HDD controller 11 is initialized.

After the analysis module 22 completes the determination of an in-position state of the HDD 200, the in-position state information of the HDD 200 is generated.

It can be understood that, in this embodiment, the analysis module 22 can be electrically connected to the BMC chip 12 through an Inter-Integrated Circuit (I2C) bus. The analyzing module 22 is configured to send the in-position state information of the HDD 200 to the BMC chip 12. The BMC chip 12 receives the in-position state information of the HDDs 200. The BMC chip 12 further compares the actual in-position state of the HDDs 200 with configuration information of HDD burned into the BMC chip 12, thereby determining whether the in-position state of the HDDs 200 is correct and generating a detection log.

In other embodiments, the HDD in-position detection system 100 further includes an indicator 23. The indicator 23 is positioned on the HDD backplane 20 and is electrically connected to the BMC chip 12. The indicator 23 indicates the actual in-position state of all HDDs 200 and/or issues reminding information accordingly under a control of the BMC chip 12. The indicator 23 can be one of an LED light module, a voice prompt module, a graphic display module, or any combination thereof.

In this embodiment, the first SGPIO connectors 13 and the second SGPIO connectors 21 function as data interfaces. In other embodiments, if the HDD controller 11 and the analysis module 22 have interfaces compatible with the SGPIO data lines, the HDD controller 11 can be directly connected to the analysis module 22 through the SGPIO data lines.

In this embodiment, the HDD controller 11 can be, but is not limited to, a Platform Controller Hub (PCH), a Host Bus Adapter (HBA), or other unit or module having a function of reading SGPIO information of HDD.

The analysis module 22 can be, but is not limited to, a Complex Programmable Logic Device (CPLD), a Field Programmable Gate Array (FPGA), a single-chip microcomputer, or other programmable controller.

In this embodiment, since different PCH chips or different HBA boards have different clock cycles, and there may be voltage glitches during an installation or disassembly of the HDD, the predetermined time is greater than 400 milliseconds.

The HDD detection system 100 includes the analysis module 22. The analysis module 22 can perform voltage level analysis of the SGPIO signals of the plurality of HDDs 200, thereby determining the in-position state of the HDDs 200. The HDD detection system 100 does not need a redesign of the HDD hardware or interface, and has advantages of high scalability, low cost, and convenient operation.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A Hard Disk Drive (HDD) detection system for detecting in-position states of a plurality of HDDs, the HDD detection system comprising:
   an HDD controller, the HDD controller electrically connected to the plurality of HDDs, the HDD controller obtaining Serial General-Purpose Input/Output (SGPIO) information of the plurality of HDDs and outputting testing signals comprising the SGPIO information;
   an analysis module, the analysis module receiving the testing signals and generating in-position state information according to level states of the testing signals; and
   a Baseboard Management Controller (BMC) chip, the BMC chip electrically connected to the analysis module;
   wherein the BMC chip receives the in-position state information from the analysis module and generates a detection log according to the in-position state information;
   wherein the analysis module comprises a level detecting unit and a timing unit, the level detecting unit is configured to receive and detect the testing signal in real time, when the level detecting unit detects a voltage level of the testing signal is maintained at a first level within a predetermined time, the level detecting unit determines that the HDD is not present;
   wherein when the level detecting unit detects a rising edge of the testing signal, the timing unit is enabled to calculate a time of the testing signal being maintained at a second voltage level, when the level detecting unit detects that the period of the testing signal being maintained at the second voltage level is greater than or equal to the predetermined time, the level detecting unit determines that the HDD is present and the HDD controller is uninitialized; and
   wherein when the level detecting unit detects that the period of the testing signal being maintained at the second voltage level is less than the predetermined time and that voltage level of the testing signal alternates between high and low within the predetermined time, the level detecting unit determines that the HDD is present and the HDD controller is initialized.

2. The HDD detection system of claim 1, wherein the predetermined time is greater than 400 milliseconds.

3. The HDD detection system of claim 1, wherein the HDD controller is one of a Platform Controller Hub (PCH) and a Host Bus Adapter (HBA).

4. The HDD detection system of claim 1, wherein the analysis module is one of a Complex Programmable Logic Device (CPLD), a Field Programmable Gate Array (FPGA), and a single-chip microcomputer.

5. The HDD detection system of claim 1, wherein the testing signal is one of a clock signal, a data output signal, and a load signal.

6. The HDD detection system of claim 1, further comprising an indicator, wherein the indicator is electrically connected to the BMC chip, the indicator is configured to indicate the in-position state information of the HDD.

7. The HDD detection system of claim 1, further comprising a plurality of first SGPIO connectors and a plurality of second SGPIO connectors, wherein the plurality of first SGPIO connectors is electrically connected to the HDD controller, the plurality of second SGPIO connectors is electrically connected to the first SGPIO connectors and the analysis module; wherein the analysis module, through the plurality of first SGPIO connectors and the plurality of second SGPIO connectors, receives the testing signals from the HDD controller.

8. A Hard Disk Drive (HDD) detection system for detecting in-position states of a plurality of HDDs, the HDD detection system comprising:
   a mainboard, the mainboard comprising an HDD controller and a Baseboard Management Controller (BMC) chip, the HDD controller electrically connected to the plurality of HDDs, the HDD controller obtaining Serial General-Purpose Input/Output (SGPIO) information of the plurality of HDDs and outputting testing signals comprising the SGPIO information; and an HDD backplane, the HDD backplane comprising an analysis module, the analysis module receiving the testing signals and generating in-position state information according to level states of the testing signals;

wherein the BMC chip is electrically connected to the analysis module, the BMC chip receives the in-position state information from the analysis module and generates a detection log according to the in-position state information;

wherein the analysis module comprises a level detecting unit and a timing unit, the level detecting unit is configured to receive and detect the testing signal in real time, when the level detecting unit detects a voltage level of the testing signal is maintained at a first level within a predetermined time, the level detecting unit determines that the HDD is not present;

wherein when the level detecting unit detects a rising edge of the testing signal, the timing unit is enabled to calculate a time of the testing signal being maintained at a second voltage level, when the level detecting unit detects that the period of the testing signal being maintained at the second voltage level is greater than or equal to the predetermined time, the level detecting unit determines that the HDD is present and the HDD controller is uninitialized; and wherein when the level detecting unit detects that the period of the testing signal being maintained at the second voltage level is less than the predetermined time and that voltage level of the testing signal alternates between high and low within the predetermined time, the level detecting unit determines that the HDD is present and the HDD controller is initialized.

9. The HDD detection system of claim 8, wherein the plurality of HDDs is inserted into the HDD backplane.

10. The HDD detection system of claim 8, wherein the predetermined time is greater than 400 milliseconds.

11. The HDD detection system of claim 8, wherein the HDD controller is one of a Platform Controller Hub (PCH) and a Host Bus Adapter (HBA).

12. The HDD detection system of claim 8, wherein the analysis module is one of a Complex Programmable Logic Device (CPLD), a Field Programmable Gate Array (FPGA), and a single-chip microcomputer.

13. The HDD detection system of claim 8, wherein the testing signal is one of a clock signal, a data output signal, and a load signal.

14. The HDD detection system of claim 8, further comprising an indicator, wherein the indicator is positioned on the HDD backplane and is electrically connected to the BMC chip, the indicator is configured to indicate the in-position state information of the HDD.

15. The HDD detection system of claim 8, further comprising a plurality of first SGPIO connectors and a plurality of second SGPIO connectors, wherein the plurality of first SGPIO connectors is positioned on the mainboard and is electrically connected to the HDD controller, the plurality of second SGPIO connectors is positioned on the HDD backplane and is electrically connected to the first SGPIO connectors and the analysis module; wherein the analysis module, through the plurality of first SGPIO connectors and the plurality of second SGPIO connectors, receives the testing signals from the HDD controller.

* * * * *